Figure 1:
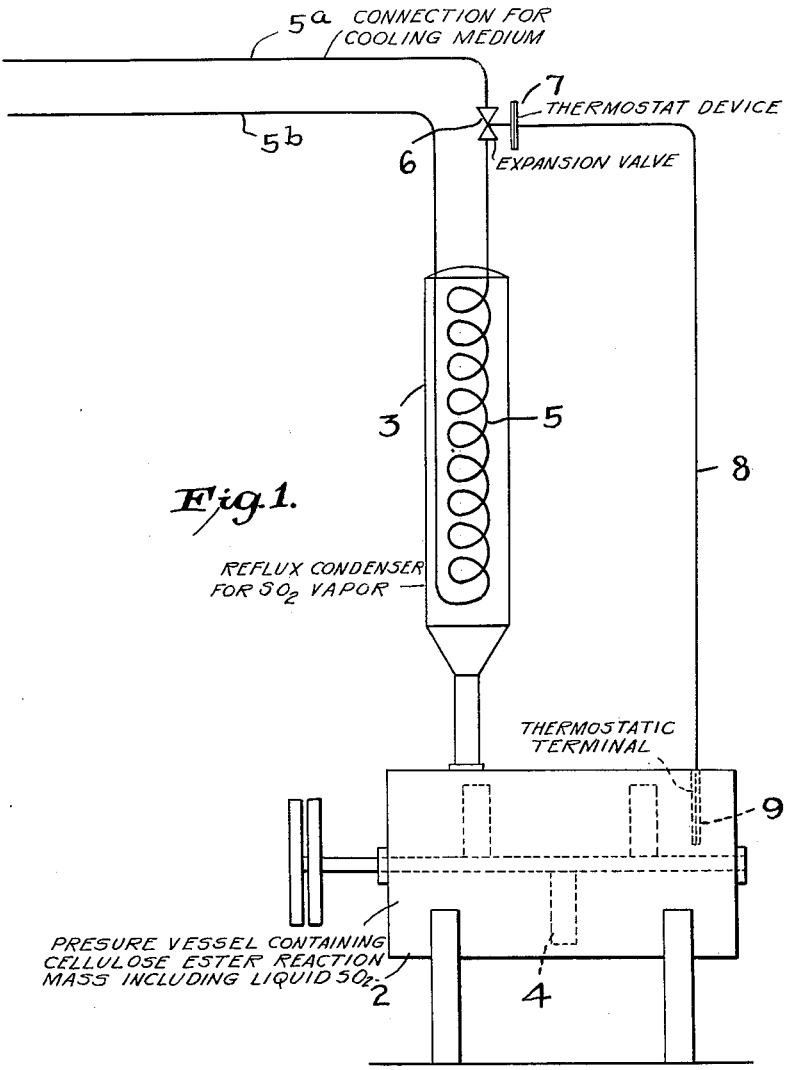

May 1, 1934.  D. B. MASON  1,956,832
MANUFACTURE OF CELLULOSE DERIVATIVES
Filed June 12, 1929  2 Sheets-Sheet 2

Patented May 1, 1934

1,956,832

UNITED STATES PATENT OFFICE 1,956,832

MANUFACTURE OF CELLULOSE DERIVATIVES

Donald B. Mason, Catonsville, Md., assignor to U. S. Industrial Alcohol Co., New York, N. Y., a corporation of West Virginia Application June 12, 1929, Serial No. 370,445

10 Claims. (Cl. 260—101)

This invention relates to a method for controlling temperature in reactions for the manufacture of organo-oxy derivatives of cellulose, including cellulose esters of organic acids, such as cellulose acetate, cellulose propionate, cellulose benzoate, etc., and cellulose ethers.

In order to effect this control I make use of a constituent of the colloidal or semi-liquid reaction mass which is volatile under the conditions of the reaction. While I do not necessarily limit myself to the liquid employed, liquid sulfur dioxid is especially advantageous since it serves excellently as a solvent medium for acetylation or like operations, and also lends itself readily to my method of control. In the Lloyd M. Burghart Patent, No. 1,816,564, dated July 28, 1931, a process for making cellulose acetate using liquid sulfur dioxid as the reaction medium has been disclosed.

The sulfur dioxid is capable of being boiled or evaporated off at the temperature and corresponding pressure of the reaction, and through the boiling off, preferably with condensation and return of the liquid, close control of the reaction temperature is obtained in the manner herein described.

The object of the invention is to provide an improved method of maintaining a desired temperature within such reaction masses. In the processes for manufacturing these cellulose esters to which the invention is applicable, the reaction mass is in the nature of a rather sluggish colloidal solution, the consistency of which varies as the reaction proceeds, and the cooling of which by ordinary means to control the heat generated by the reaction is a matter of considerable difficulty.

A further object is to secure the desired close control of the reaction temperature by promptly abstracting heat from all points within the reaction mass whenever the temperature tends to rise above an intended value. Another object is to secure uniformity of temperature throughout the reaction mass, in order to cause the reaction to proceed smoothly and to obtain a uniform cellulose derivative of good quality. Still another object is to employ the latent heat of vaporization instead of sensible heat for cooling such reaction masses. Other objects of the invention will become apparent as the specification proceeds.

The standard practice for controlling exothermic liquid phase reactions involves the transfer of heat from the mass through metal walls. By this method only the film adjacent to the cold surface is cooled, and agitation is necessary to remove the cooled portion and bring up a warm portion to be cooled in its turn. In this way cooling progresses but slowly and with great lack of uniformity, and the closeness of control made possible by my invention can scarcely be realized.

In the manufacture of a cellulose-ester, such as cellulose acetate, it is desirable not only to hold the temperature at a fixed point but also to be able to cause the temperature to undergo predetermined change. By existing methods that is even more difficult than the maintenance of a fixed temperature.

In carrying out my method of temperature control for these reactions, the cellulose ester reaction mixture in which is included a medium of the character indicated, is enclosed in a tight vessel adapted to hold a condition of pressure, which in the case of sulfur dioxid, and when observing suitable temperatures for acylation, would ordinarily be above the pressure of the atmosphere. Aside from the order of pressure, confinement of vapor of the included control fluid and of the reaction mass with which it is in contact is essential for the attainment of the purpose in view. As the temperature tends to rise above the desired point as the result of heat liberated by the reaction, a sufficient portion of the confined vapor is removed, preferably by condensation, to permit an additional quantity of liquid to be boiled or vaporized out of the reaction mass, thereby directly absorbing heat from the mass to supply the latent heat required to change the fluid medium from the liquid to the vapor phase. When the heat evolved has been disposed of sufficiently for the moment, or when the temperature tends to fall, the condensation or removal of vapor is sufficiently reduced, to arrest the fall or to allow the temperature to rise. This is repeated, or caused to occur in a more or less continuous manner, so as to hold the temperature at a practically constant level, when desired, and to cause the temperature to change at will or automatically, irrespective of the rate at which the reaction would proceed if ungoverned.

The regulation may be conveniently accomplished with the aid of an automatic factor under control of an effect of the reaction. Such effect might be pressure or temperature, but thermal primary control is preferable as being the most direct. A suitable thermostat responsive to the temperature of the reaction mass, or in the reaction vessel, may therefore control a valve, or some equivalent, so as to hold the temperature at any given level, and by suitable manual or automatic adjustment of the thermostat, or of the valve, the temperature of the reaction can be changed at different times.

Regulated removal of vapor which causes additional liquid to be vaporized from the cellulose derivative reaction mass may be accomplished either by condensing vapor within the confined space, or by releasing vapor from the space, condensing it and returning the condensate or an equivalent amount of the liquid to the reaction mass.

A further feature of the invention involves the provision of means for supplying heat to the reaction mass, to raise the vessel to a desired temperature in the beginning, or to keep the temperature from falling below a desired point at any time, if for any reason it should tend to do so. This factor is preferably coordinated with the cooling factor, in the sense that when heat is to be extracted from the mass to keep the temperature from rising the supply of heat is shut down or cut off, and vice-versa if the temperature should tend to fall, the cooling by vaporization from the mass is reduced or suppressed at the same time that extraneous heat is turned on or supplied in greater amount.

The invention may be carried out in specifically different ways. The accompanying drawings show two forms of execution by way of illustration but not in limitation of the invention.

Figure 2:
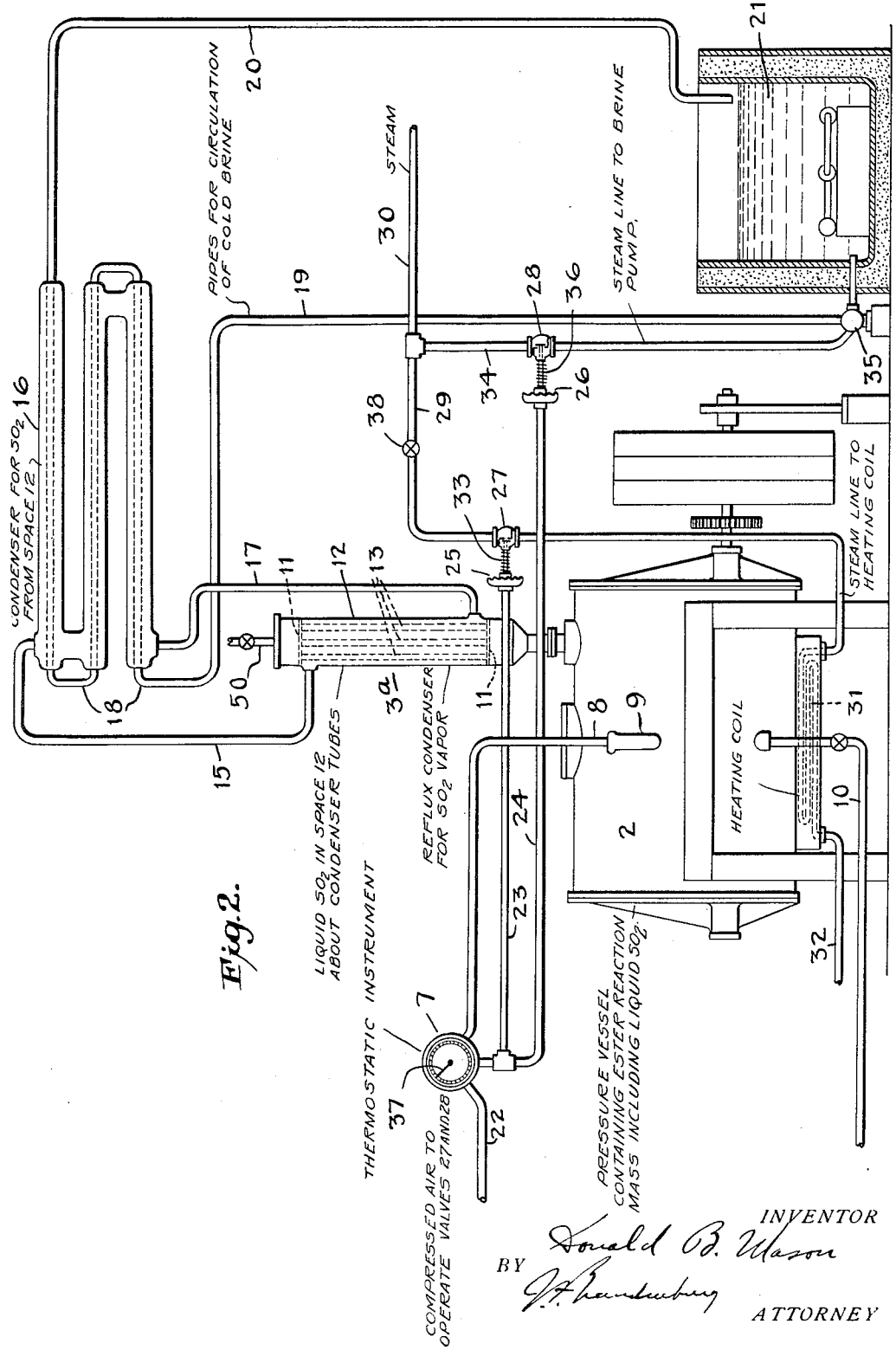

In these drawings:

Fig. 1 is an elevation of apparatus suitable for the acetylation, or acylation, of cellulose or a cellulose derivative, and/or hydration operations, the apparatus being shown equipped with one form of the temperature control shown schematically; and Fig. 2 is an elevation of such apparatus showing the form of control of Fig. 1 somewhat elaborated and with the inclusion of an additional, cooperative element of control.

In Fig. 1, the numeral 2 designates a closed acylation, or acetylation, vessel. This vessel represents a tight chamber or system in which to carry on reactions in the manufacture of organo-oxy derivatives of cellulose, more especially cellulose acetate or other cellulose esters of organic acids. The vessel is designed to contain the cellulose ester reaction mass, to confine a body of vapor of a vaporizable constituent, or constituents, of the mixture, and to hold such pressure as will be consistent with the desired temperature for the reaction. With liquid sulfur dioxid employed as a reaction medium, and operating at temperatures favorable to such reactions, the vapor pressure in the vessel would be a positive pressure, considerably above that of the atmosphere. For the kind of operation now found to be practical, and which is more particularly contemplated herein, positive pressures up to maximum pressures of 90-100 lbs., gauge pressure, are employed.

The numeral 3 designates a condenser in open communication with the interior of the vessel. In some cases the condensing means might not be outside the walls of the vessel proper, but in order to avoid undue enlargement of the vessel itself or interference with the mechanically operated stirrer 4 with which the vessel should be provided, and also to keep the condensing surface from becoming coated with the reaction mixture, which would interfere with heat transfer, it is desirable to employ a reflux condenser extending above the vessel and connected tightly with an opening in its top. The enclosure of this condenser is closed except for its communication with the vessel, thus forming an extension of the pressure-tight system which includes the interior of the vessel containing the reaction mass and the vapor in contact therewith.

A cooling coil 5 in the condenser is connected by a pipe $5^a$ with the liquid storage tank of a mechanical refrigerating machine (not shown) through an expansion valve 6, or is otherwise connected for controlled supply or circulation of cooling medium. $5^b$ is a return line from the coil.

The valve 6, or its equivalent, is represented as controlled by a thermostatic device 7 having a connection 8 passing to the reaction vessel, where its terminal 9 is so disposed as to be in contact with the reaction mass, or in sufficiently close thermal relation thereto. Any suitable type of thermostat or equivalent temperature responsive device may be employed, but preferably one adapted to cause varying degrees of opening and closing of the valve 6. For this purpose a closed pipe containing expansible gas or vapor is suitable, one end of the pipe being connected with known means at 7 so that expansion and contraction of the gas will control the valve. Such devices are regularly provided with manual setting means for setting the thermostat to maintain any desired temperature, thus enabling the controlled temperature to be changed whenever desired.

Let it be assumed for purpose of illustration that the vessel 2 is charged with an acetylation mixture comprising cellulose, or a cellulose derivative, an acetylating agent such as acetic anhydride or acetyl chlorid, and a solvent medium consisting, entirely or in considerable part, of liquid sulfur dioxid. As the reaction progresses, the cellulose gradually loses its structure and the ester formed goes into colloidal solution in the liquid sulfur dioxid and the acetic acid which may be present or which results from the reaction. The consistency of the mass changes, becoming eventually that of a rather sluggish liquid.

Over a period of the acetylation reaction it may be desired to maintain an even temperature in the reaction mass, which temperature may, for illustration, be between 20° C. and 30° C. The automatic controlling device 7 is set for a definite temperature, let us say 20° C., and as the reaction proceeds, whenever the temperature in the vessel 2 rises somewhat above that point, the valve 6 is opened, or is opened to a greater extent, whereas, whenever the reaction temperature falls slightly below 20° C., the valve 6 is closed or the opening through it is reduced.

When the valve 6 is operated in the opening sense, liquid, or more liquid, from the mechanical refrigerating unit is expanded into the coil 5, which lowers the temperature of the coil and causes more condensation of vaporized solvent to drop back into the vessel 2, where it enters again into the reaction mass.

The condensing of the vapor around the coil 5 removes that much vapor from the vapor space, and allows some of the liquid sulfur dioxid in the mass to boil or evaporate out. This tends to take place throughout the solution or reaction mass, thereby removing sensible heat as nearly as possible at all points and throughout the mass. The heat removed from the reaction mixture supplies the latent heat required for vaporization.

The then-ensuing tendency of the temperature in the fluid reaction mass to drop causes the valve 6 to close, or close slightly, thus cutting off or diminishing the supply of cooling medium to the coil 5. Since the valve 6 and the automatic controlling device 7 can be made to operate on very slight temperature change, the reaction mass can be kept at substantially constant temperature, without attention.

In the case given in which the reaction solvent is liquid sulfur dioxid the vapors which are evolved contain also other vaporized constituents of the mixture, such as acetic acid. In its broader aspect the invention is not limited to the particular liquids employed as reaction solvent and as a temperature control medium, and such liquids may be simple or may be mixed.

The invention also makes it possible to maintain, for shorter or longer times, desired initial and final temperatures, which may be, respectively, quite low and comparatively high, to raise or depress the temperature from one level to another at different stages of the process, or to cause the temperature to change at any desired rate over any period. The ability to do this is of considerable advantage for smoothness of operation as the consistency of the semi-liquid mass is altered during the reaction, or for modifying the physical characteristics of the solution or of the eventual product. By suitable manual, or even mechanical automatic manipulation of the control instrument, the temperature of the reaction can be caused to vary in any predetermined manner that may be desired.

Thus, in acetylating cellulose in a reaction medium of liquid sulfur dioxid, to obtain chloroform-soluble cellulose acetate, it is sometimes desirable to cause the reaction temperature to follow a predetermined rate of rise from a lower to a higher temperature over a period of several hours. After this phase, there may be a period of several hours during which the temperature is held constant, still during the acetylation step. During the hydration step, which may follow immediately, and during which the reaction mixture is digested with a limited amount of water or other so-called hydrating agent for the purpose of modifying the "primary" cellulose acetate to the acetone-soluble form (or other type of solubility), it may be desirable again to raise the temperature rapidly to a new point, at which it may be maintained for a further period of hours.

In Fig. 2, the closed pressure vessel is designated by the same reference character 2, and 10 is a valved discharge conduit through which the reaction mixture is delivered under pressure when the acetylation and/or hydration has been completed. The condenser 3ᵃ contains transverse perforated plates 11 which divide off a chamber 12 inside the condenser shell from the vapor space in the vessel 2 and from the interior of narrow tubes 13, the opposite ends of which tubes are tightly secured in the openings in said plates. The chamber 12 contains a body of liquid sulfur dioxid or other volatile liquid under positive pressure;—or a less volatile liquid under lower pressure, or even sub-atmospheric pressure may be employed. A vapor pipe 15 leads from the upper portion of this chamber to a condensing coil 16, from which a pipe 17 returns condensate to the lower portion of the chamber in question. The vapor space in the condenser coil 16 is traversed by a cooling coil 18 connected with supply and return lines 19 and 20 for circulation of cold brine. The supply line 19 leads from the lower portion of the brine tank 21 of an ammonia refrigerating unit, and the return line 20 delivers back into this tank.

This view illustrates another feature of the invention, which is the provision of means for supplying heat to the mass in the reaction vessel, with regulation and control of this heating factor conjointly with the cooling factor resulting from vaporization of liquid from the mass.

The thermostatic instrument 7 is connected by a closed vapor tube 8 with the vessel 2 at a point such that its inner terminal 9 is subject to the temperature of the reaction mass. The instrument 7 controls an air valve, which is inside the instrument and need not be illustrated, to control the supply of compressed air from a pipe 22 to two pipes 23 and 24, which terminate, respectively, in pressure actuated devices 25 and 26 which operate valves 27 and 28. The valve 27 is in a branch 29 of a steam line 30 leading to a heating coil 31 in the bottom of the acetylation vessel, the outlet from this coil being marked 32; and this valve has a spring 33 which tends to open it. The valve 28 is in another branch 34 of the steam line, leading to a brine pump 35 in the brine supply pipe, this valve having a spring 36 which tends to close it.

A setting member 37 for the instrument 7 is indicated, also a valved passage 50 communicating with the top of the condenser. The latter is for the purpose of venting air out of the closed system at the commencement of operations to insure an atmosphere composed simply of the vapor of the liquid constituent. This will be understood to apply to the other form as well. The same connection may be utilized for introducing liquid ingredients into the reaction vessel.

Let it be assumed that the vessel 2 contains a cellulose ester reaction mixture in process, this mixture containing a considerable amount of liquid sulfur dioxid, or such other medium as may be found suitable for the purposes of this invention.

When the temperature of the reaction mixture rises above the desired point, the controlling device causes the air valve in the instrument 7 to open, allowing air to flow from the air supply to the valve operating devices 25 and 26. This causes the valve 27 to shut off, or reduce, the flow of steam to the heating coil 31, and also opens the valve 28, so as to turn on, or to increase, the flow of steam to the brine pump 35, which latter pumps cold brine from the tank 21 through the cooling coil 18, or increases the circulation of brine through this coil. The cooling of vapors in the coil 16 causes the condensation of sulfur dioxid vapors in this coil, the condensed vapors, with their latent heat removed, returning through the line 17 to the chamber 12 in the condenser 3ᵃ. This condensation of some of the vapor of the liquid in the chamber 12 causes some of this liquid to vaporize, and the absorption of latent heat chills the tubes 13 and takes heat from the vapors inside these tubes. This causes vapor from the vessel 2 to condense in the tubes and to drop back as liquid into the reaction mass in the vessel 2. The consequent evaporation or boiling off of liquid from the cellulose acetate reaction mass abstracts heat from within the mass, thus lowering the temperature of the mass. Thereby, any tendency of the temperature of the exothermic reaction to rise above the point desired at any stage is checked at its inception.

If at any time the mixture should be too cold, or should tend to fall below the degree of temperature then desired, the control which has been described turns on steam to the heating coil 31, or causes an increased flow of steam through this coil, and at the same time shuts off or cuts down the circulation of cooling medium through the coil 18, thereby either causing the temperature of the reaction mass to come up to the desired point, where it is held, or neutralizing any tendency of the temperature to fall below the desired point.

By adjusting the instrument 7 by means of the setting device 37, the temperature to be maintained can be made higher or lower, or can be caused to rise or fall over a period, such change affecting both the cooling and the heating factors which influence and control the temperature of the cellulose ester mixture during the reaction. At any stage when a supply of extraneous heat is not required, the steam branch 29 can be closed by a valve 38.

Numerous other forms of execution of the invention may be employed. While automatic or semi-automatic regulation controlled by a physical effect of the reaction, and specifically by the temperature of the reaction, so as to maintain a uniform temperature, this regulation adjustable at will, or automatically, so as to cause the reaction temperature to undergo desired change, is to be preferred, I do not exclude purely manual regulation of the valves or equivalent elements, since an attendant can hold the reaction temperature quite closely, and can raise and lower the temperature whenever desired.

I claim:

1. Method of carrying on reactions for the manufacture of cellulose esters of organic acids, which comprises employing liquid sulfur dioxid as a medium for the reaction, holding under pressure the vapor of liquid sulfur dioxid in contact with the colloidal reaction mass, and removing sulfur dioxid vapor in a manner to regulate the abstraction of heat from the reaction mass due to vaporization of said medium and thereby secure close control of the reaction temperature.

2. Method of carrying on reactions for the manufacture of cellulose esters of organic acids, which comprises employing liquid sulfur dioxid as a medium for the reaction, holding under pressure the vapor of liquid sulfur dioxid in contact with the colloidal reaction mass, removing sulfur dioxid vapor in a manner to regulate the abstraction of heat from the reaction mass due to vaporization of said medium and thereby secure close control of the reaction temperature, and returning to the reaction mass liquid sulfur dioxid condensed from the vapor so removed.

3. Method of carrying on reactions for the manufacture of cellulose esters of organic acids, which comprises employing liquid sulfur dioxid as a medium for the reaction, holding under pressure the vapor of liquid sulfur dioxid in contact with the colloidal reaction mass, and condensing the sulfur dioxid vapor in a manner to regulate the temperature of the mass.

4. Method of carrying on reactions for the manufacture of cellulose esters of organic acids, which comprises employing liquid sulfur dioxid as a medium for the reaction, holding under pressure the vapor of liquid sulfur dioxid in contact with the colloidal reaction mass, removing sulfur dioxid vapor so as to bring about the abstraction of heat from the reaction mass by consequent vaporization, and regulating the removal of sulfur dioxid vapor by and in accordance with the temperature of the reaction mass.

5. Method of carrying on reactions for the manufacture of cellulose esters of organic acids, which comprises employing liquid sulfur dioxid as a medium for the reaction, holding under pressure the vapor of liquid sulfur dioxid in contact with the colloidal reaction mass, removing sulfur dioxid vapor so as to bring about the abstraction of heat from the reaction mass by consequent vaporization, regulating the removal of sulfur dioxid vapor by and in accordance with a physical effect of the reaction, and modifying such regulation during the course of the reaction to cause the temperature to undergo change.

6. Method of carrying on reactions for the manufacture of cellulose esters of organic acids, which comprises employing liquid sulfur dioxid as a medium for the reaction, holding under pressure the vapor of liquid sulfur dioxid in contact with the colloidal reaction mass, condensing sulfur dioxid vapor, regulating the condensation and thereby the extraction of heat from the reaction mass in response to variation in the reaction temperature, and modifying such regulation during the course of the reaction to cause the temperature to undergo predetermined change.

7. Method of carrying on reactions for the manufacture of cellulose esters of organic acids, which comprises employing liquid sulfur dioxid as a medium for the reaction, holding under pressure the vapor of liquid sulfur dioxid in contact with the colloidal reaction mass, supplying heat to the reaction mass, regulating the supply of heat, and conjointly with such regulation removing sulfur dioxid vapor in a manner to regulate the consequent abstraction of heat from the reaction mass.

8. Method of carrying on reactions for the manufacture of cellulose esters of organic acids, which comprises employing liquid sulfur dioxid as a medium for the reaction, holding under pressure the vapor of liquid sulfur dioxid in contact with the colloidal reaction mass, supplying heat to the reaction mass, regulating the supply of heat and conjointly with such regulation condensing sulfur dioxid vapor in a manner to regulate the consequent abstraction of heat from the reaction mass.

9. Method of carrying on the manufacture of cellulose acetate, which comprises enclosing in a tight vessel adapted to hold pressure an acetylation mixture containing liquid sulfur dioxid as a reaction medium, controlling the temperature of the reaction by regulated vaporization under pressure of the liquid medium, and returning liquid to the mixture.

10. The method of manufacturing a cellulose ester of an organic acid, which comprises performing the ester treatment in the presence of liquid sulfur dioxid, and controlling the temperature of the mass by regulated vaporization of the liquid sulfur dioxid.

DONALD B. MASON.